(12) United States Patent
Lee

(10) Patent No.: US 8,066,308 B2
(45) Date of Patent: Nov. 29, 2011

(54) LATCH MECHANISM ASSEMBLY

(75) Inventor: Ming-Chang Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 781 days.

(21) Appl. No.: 12/120,251

(22) Filed: May 14, 2008

(65) Prior Publication Data
US 2009/0167061 A1 Jul. 2, 2009

(30) Foreign Application Priority Data

Dec. 26, 2007 (CN) .......................... 2007 1 0203423

(51) Int. Cl.
E05C 9/00 (2006.01)
E05C 3/06 (2006.01)
E05C 9/10 (2006.01)
E05C 19/06 (2006.01)

(52) U.S. Cl. ................. 292/49; 292/44; 292/45; 292/80

(58) Field of Classification Search ............... 292/44, 292/45, 50, 54, 49, 53, 80, 84, 87, 89, 194, 292/219, 197, 198, DIG. 11, DIG. 61, DIG. 37
See application file for complete search history.

(56) References Cited

U.S. PATENT DOCUMENTS

| 2,905,493 | A | * | 9/1959 | Tocchetto | 292/37 |
| 2,935,033 | A | * | 5/1960 | Dunlap | 410/147 |
| 4,547,006 | A | * | 10/1985 | Castanier | 292/37 |
| 6,115,239 | A | | 9/2000 | Kim | |
| 7,234,735 | B2 | | 6/2007 | Harada | |
| 2006/0133019 | A1 | | 6/2006 | Yamazaki et al. | |

* cited by examiner

*Primary Examiner* — Thomas Beach
*Assistant Examiner* — Nathan Cumar
(74) *Attorney, Agent, or Firm* — Altis Law Group, Inc.

(57) ABSTRACT

A chassis includes a cover unit, a base unit which includes a bottom panel and a cover panel fixed to the bottom panel, a through hole defined in the cover panel, and a latch mechanism assembly. The latch mechanism assembly includes a hook protruding from the cover unit, an operating apparatus mounted to the bottom panel, a supporting member mounted to the bottom panel, a latch member resiliently mounted to the supporting member, and a connecting pole connecting the latch member to the operating apparatus. The hook is capable of extending through the through hole of the cover panel. The latch member includes a latch portion capable of securing the hook. The latch member is capable of engaging the hook when the hook is located within the through hole, and the operating apparatus is capable of retracting the connecting pole and thus causing the latch member to disengage the hook.

17 Claims, 11 Drawing Sheets

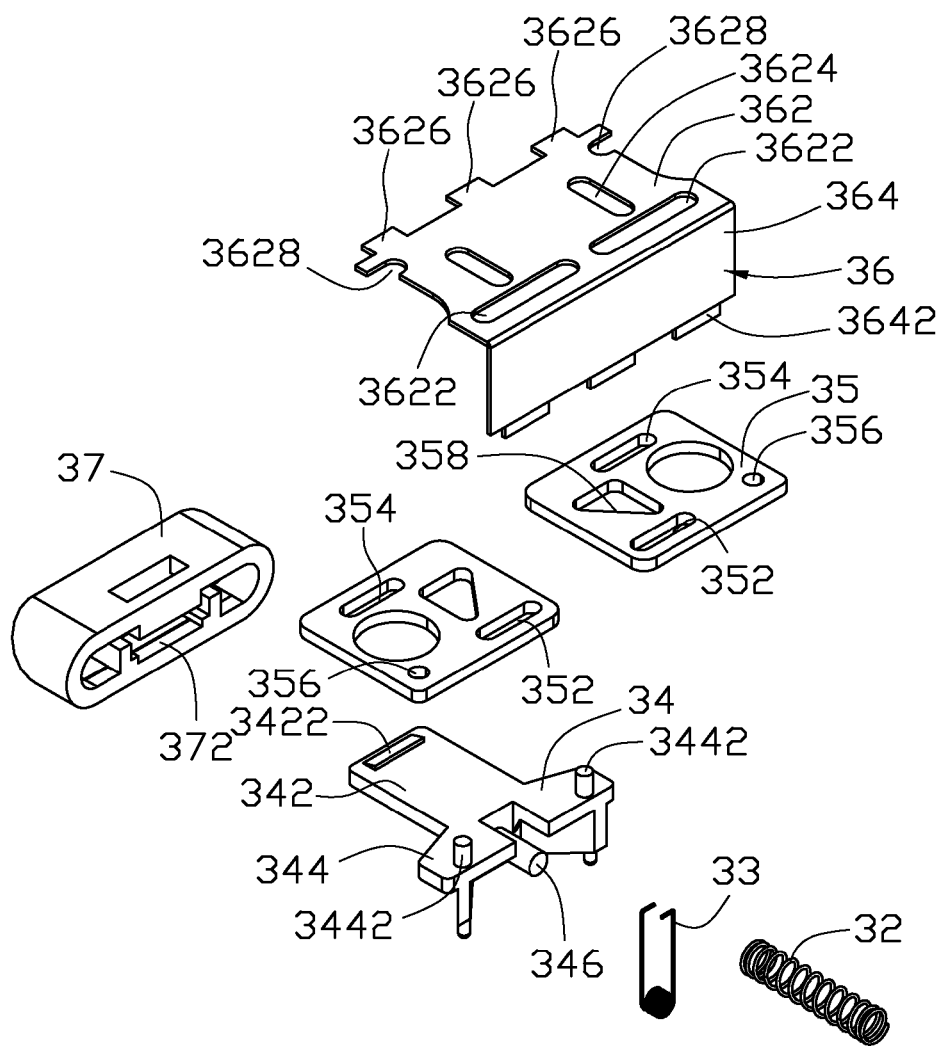
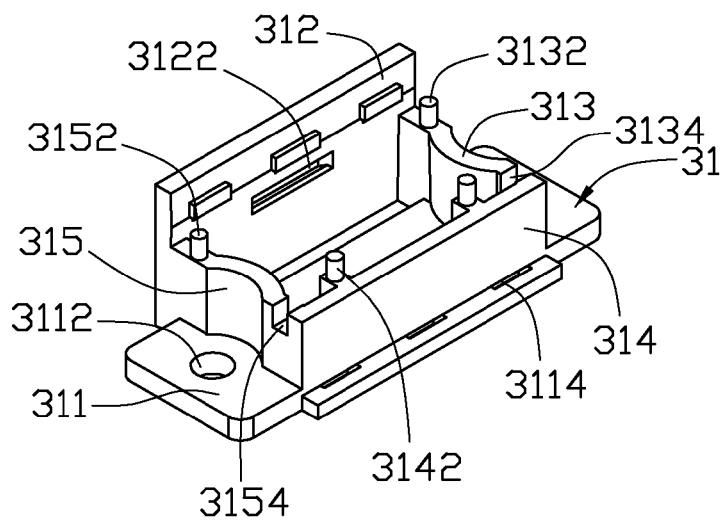
FIG. 4

LATCH MECHANISM ASSEMBLY

BACKGROUND

1. Field of the Invention

The present invention relates to latch mechanism assemblies, and more particularly to a latch mechanism assembly for a portable computer.

2. Description of Related Art

Typically, an electronic device, such as a portable computer, includes a cover unit and a base unit pivotably connected to the cover unit, and a latch mechanism is provided to lock the cover unit to the base unit.

As disclosed in U.S. Pat. No. 6,115,239, a latch mechanism for locking a cover unit to a base unit includes a latch frame movably installed inside of the cover unit, a plurality of latches are formed on the latch frame at predetermined intervals, one end portion of each latch protrudes from a front surface of the cover unit, and a slide knob is operatively connected to the latch frame for concurrently operating the latches. The latches are inserted into and locked by latch grooves formed at positions corresponding to the latches on an upper surface of the base unit. The latches are urged against the base unit by elastic forces applied by double springs mounted to two ends of the latch frame. However, to open the cover unit, the slide knob is slid to counter the elastic forces of the springs and disengage the latch mechanism from the base unit. The sliding force depends on the friction between the slide knob and the operator's fingers. It is laborious for an operator to provide enough force to move a slide knob.

What is needed, therefore, is a labor saving latch mechanism assembly.

SUMMARY

In one embodiment, a chassis includes a cover unit, a base unit which includes a bottom panel and a cover panel fixed to the bottom panel, a through hole defined in the cover panel, and a latch mechanism assembly. The latch mechanism assembly includes a hook protruding from the cover unit, an operating apparatus mounted to the bottom panel, a supporting member mounted to the bottom panel, a latch member resiliently mounted to the supporting member, and a connecting pole connecting the latch member to the operating apparatus. The hook is capable of extending through the through hole of the cover panel. The latch member includes a latch portion capable of securing the hook. The latch member is capable of engaging the hook when the hook is located within the through hole, and the operating apparatus is capable of retracting the connecting pole and thus causing the latch member to disengage the hook.

Other advantages and novel features of the present invention will become more apparent from the following detailed description of an embodiment when taken in conjunction with the accompanying drawings, in which:

BRIEF DESCRIPTION OF THE DRAWINGS

FIG. 4 is an exploded view of the operating apparatus of FIG. 1, but viewed from another aspect, the operating apparatus including a receiving member;

DETAILED DESCRIPTION

Figure 1:
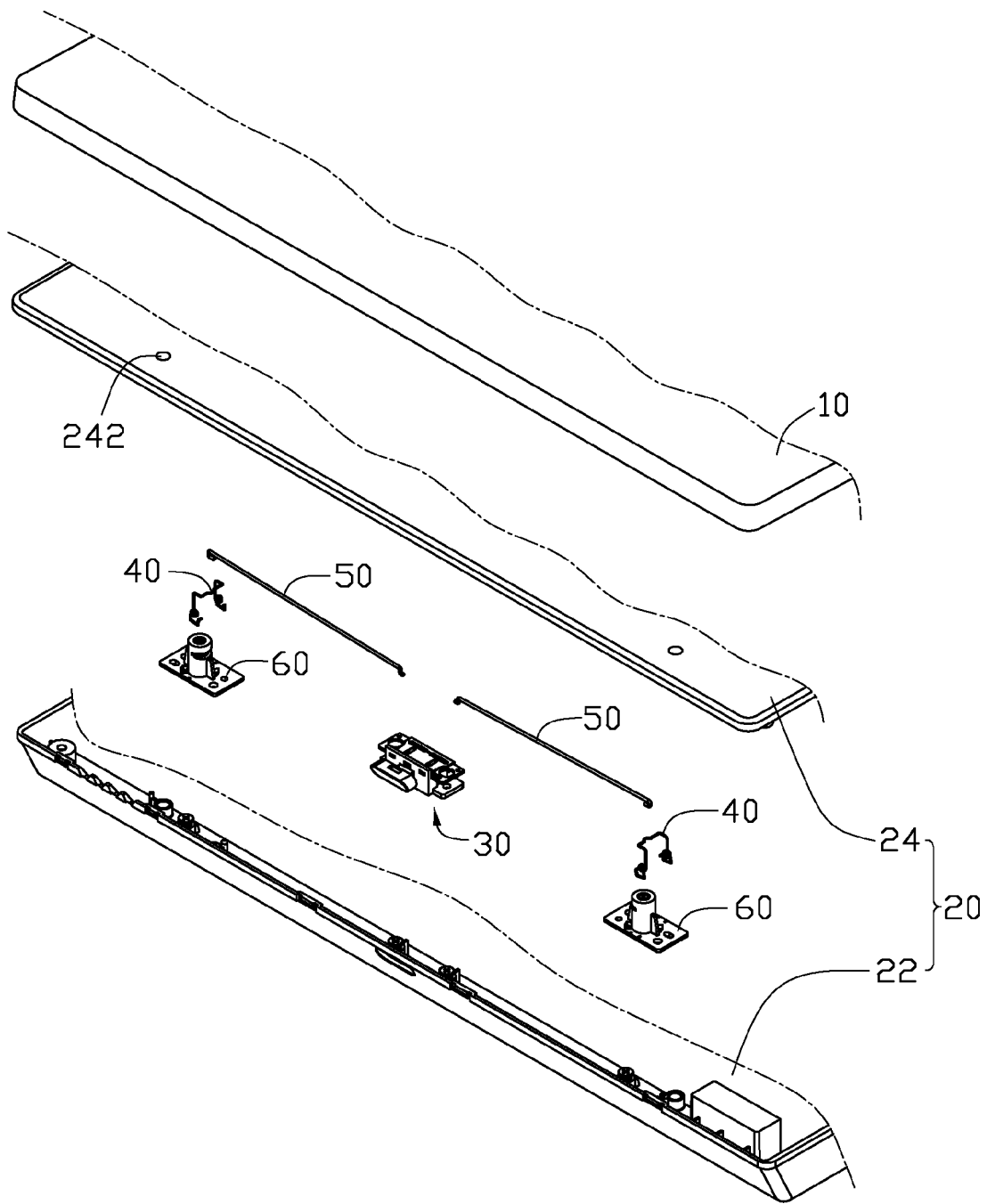
FIG. 1 is an exploded, isometric view of a latch mechanism assembly in accordance with an embodiment of the present invention with a cover unit and a base unit, the base unit including a bottom panel and a cover panel, the latch mechanism assembly including an operating apparatus, two latch members, two connecting poles, and two mounting members.
Figure 2:
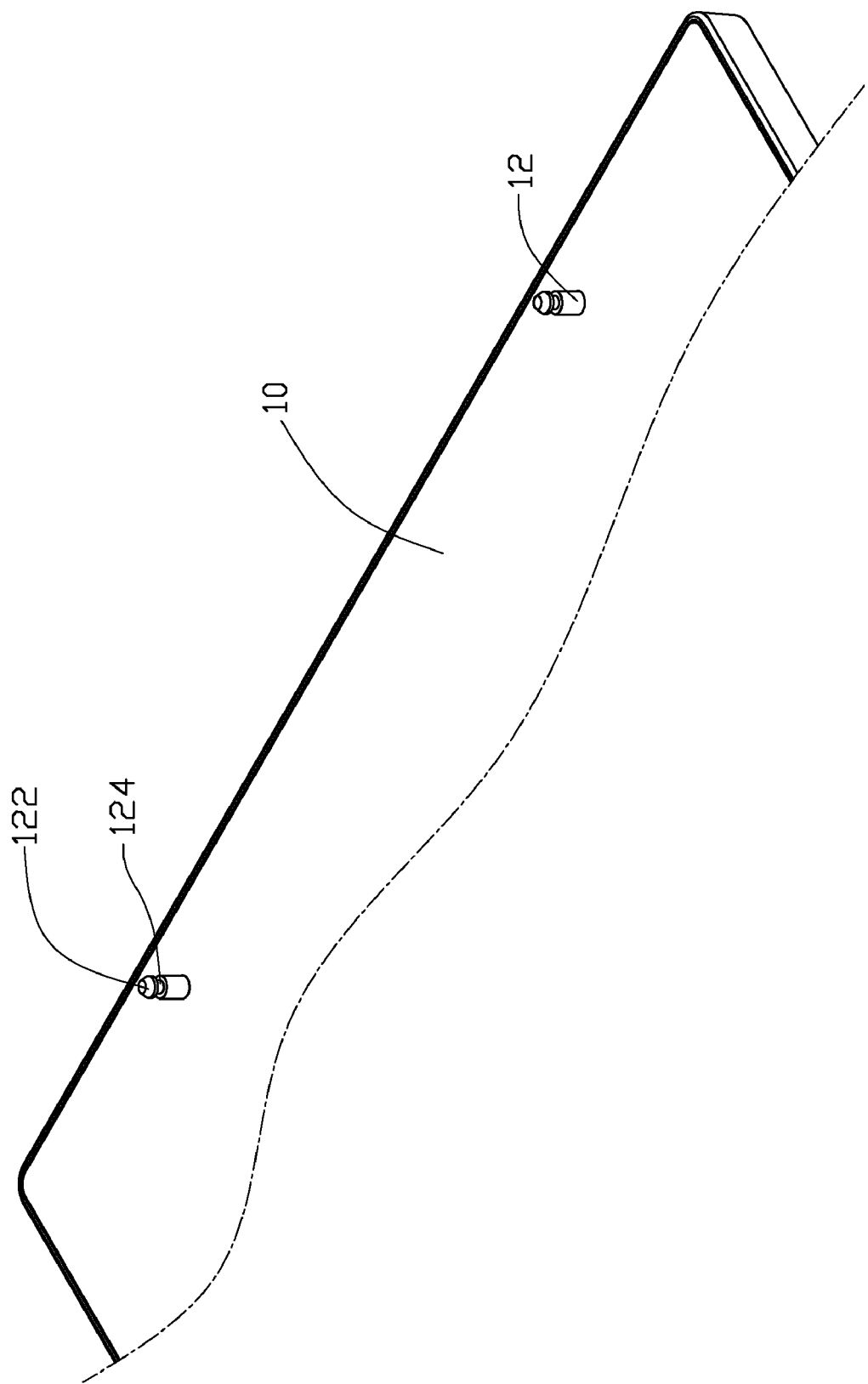
FIG. 2 shows another view of the cover panel of FIG. 1.

Referring to FIGS. 1 and 2, a latch mechanism assembly in accordance with an embodiment of the present invention is provided for locking a cover unit 10 to a base unit 20 of an electronic device, such as a portable computer. The latch mechanism assembly includes two pins 12 fixed to the cover unit 10, an operating apparatus 30 mounted to the base unit 20, two latch members 40, two connecting poles 50, and two supporting members 60.

Each pin 12 includes a tapered leading portion 122 formed at a free end thereof. An annular locking slot 124 is defined in the pin 12 in the vicinity of the leading portion 122. The base unit 20 includes a bottom panel 22, and a cover panel 24 covered on the bottom panel 22. A plurality of electronic components, such as a motherboard, a power supply, data storage devices, and so on, is arranged between the bottom panel 22 and the cover panel 24. Two through holes 242 are defined in the cover panel 24 corresponding to the pins 12 of the cover unit 10.

Figure 3:
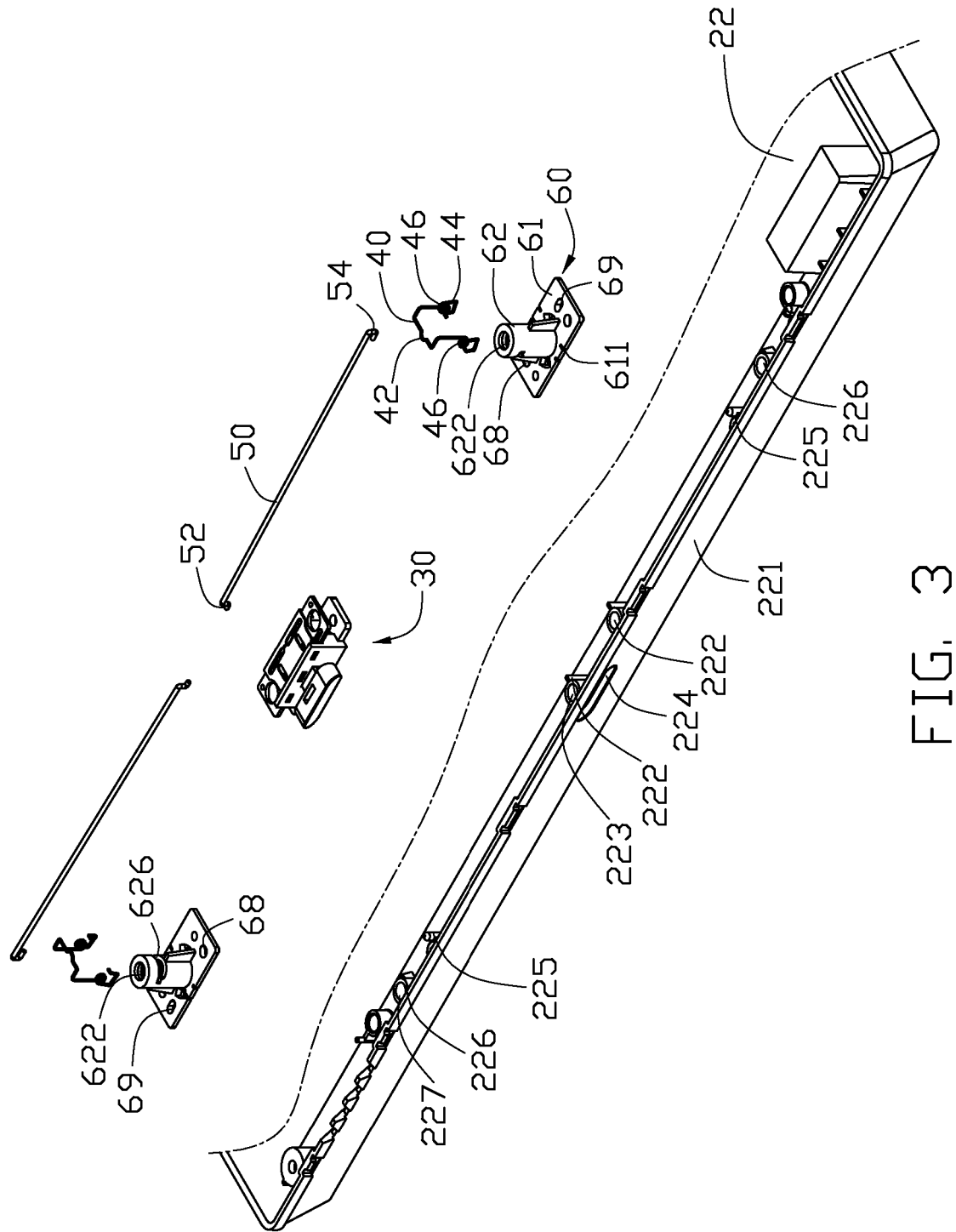
FIG. 3 is an enlarged view of the latch mechanism assembly with the bottom panel of FIG. 1.

Referring also to FIG. 3, the bottom panel 22 has a flange 221 extending up from one side thereof. A receiving slot 224 is defined in a middle of the flange 221. The bottom panel 22 includes two columns 222 adjacent to the receiving slot 224, two locating rods 225, and two mounting rods 226 adjacent to the locating rods 225 respectively extending up therefrom. A rib (not labeled) is formed on the bottom panel 22 connected to each column 222. A mounting hole 223 is defined in each column 222. The locating rods 225 and the mounting rods 226 are located away from the receiving slot 224. A mounting hole 227 is defined in each mounting rod 226.

Figure 5:
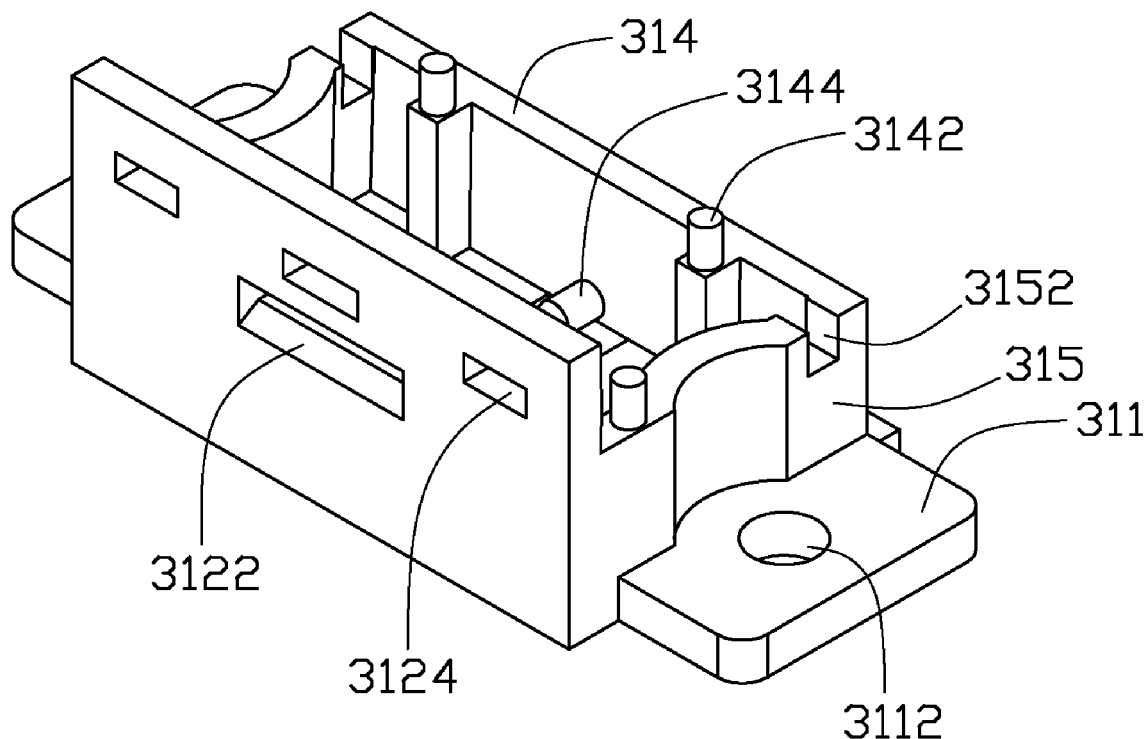
FIG. 5 is a view of the receiving member of FIG. 4, but viewed from another aspect.

Referring also to FIGS. 4 and 5, the operating apparatus 30 includes a receiving member 31, a first resilient member 32, a second resilient member 33, a driving member 34, two linking members 35, a cover 36, and an operating member 37. The receiving member 31 includes a bottom wall 311, a first sidewall 312 perpendicularly extending up from a side of the bottom wall 311, a second sidewall 313 perpendicularly extending up from an end of the bottom wall 311 and perpendicularly connected to one end of the first sidewall 312, a third sidewall 314 opposite to the first sidewall 312 perpendicularly extending up from an opposite side of the bottom wall 311 and perpendicularly connected to the second sidewall 313, and a fourth sidewall 315 opposite to the second sidewall 313 perpendicularly extending up from an opposite end of the bottom wall 311 and perpendicularly connected to the first sidewall 312 and the third sidewall 314. Two through holes 3112 are defined in opposite ends of the bottom wall 311 outside of the second and fourth sidewalls 313, 315 respectively. Three elongated locking slots 3114 are defined in the bottom wall 311 outside of the third sidewall 314. A through slot 3122 is defined in a middle of the first sidewall 312. Three protrusions which are not labeled extend from an inner surface of the first sidewall 312. Three locking slots 3124 are defined in the first sidewall 312 below the three protrusions respectively and run through the first sidewall 312. Two posts 3132, 3152 extend up from the tops of the second sidewall 313 and the fourth sidewall 315 respectively, adjacent to the first sidewall 312. Two cutouts 3134, 3154 are defined in the second sidewall 313 and the fourth sidewall 315 respectively in the vicinity of the third sidewall 314. Two posts 3142 extend up from the top of the third sidewall 314. A post 3144, as seen in FIG. 5, extends towards the first sidewall 312 from a lower portion of the third sidewall 314.

The first resilient member 32 is a compressing spring. The second resilient member 33 is a torsion spring. The second resilient member 33 includes two blocking ends.

The driving member 34 includes a Y-shaped main body. The main body includes an operating portion 342 and two driving portions 344 extending from an end of the portion 342. A wedge-shaped block 3422 extends up from an opposite end of the operating portion 342. A driving post 3442 extends up from each driving portion 344. A shaft 346 extends between the driving portions 344 away from the operating portion 342.

Each linking member 35 is rectangular-shaped. A first sliding slot 352 and a second sliding slot 354 are defined in two opposite sides of the linking member 35 adjacent to two diagonally opposite corners respectively. The first and second sliding slots 352, 354 are parallel to each other. A locking hole 356 is defined in the linking member 35 at the same side as the first sliding slot 352. A triangular slot is defined in the linking member 35 between the first and second sliding slots 352, 354. An slanted surface 358 is formed at an inner sidewall of the triangular slot.

The cover 36 includes a horizontal plate 362 and an upright plate 364 perpendicularly extending down from a side of the horizontal plate 362. Two elongated slots 3622 parallel to the upright plate 364 are defined in the horizontal plate 362, adjacent to a conjunction of the horizontal plate 362 and the upright plate 364. Two limiting slots 3624 perpendicular to the elongated slots 3622 are defined in the horizontal plate 362. Three engaging portions 3626 extend from an opposite side of the horizontal plate 362. Two arc-shaped locking slots 3628 are defined in opposite ends of the horizontal plate 362 respectively, adjacent to the engaging portions 3626. Three engaging portions 3642 extend down from a bottom of the upright plate 364.

The operating member 37 defines a locking slot 372 configured for receiving the operating portion 342 of the driving member 34.

Figure 7:
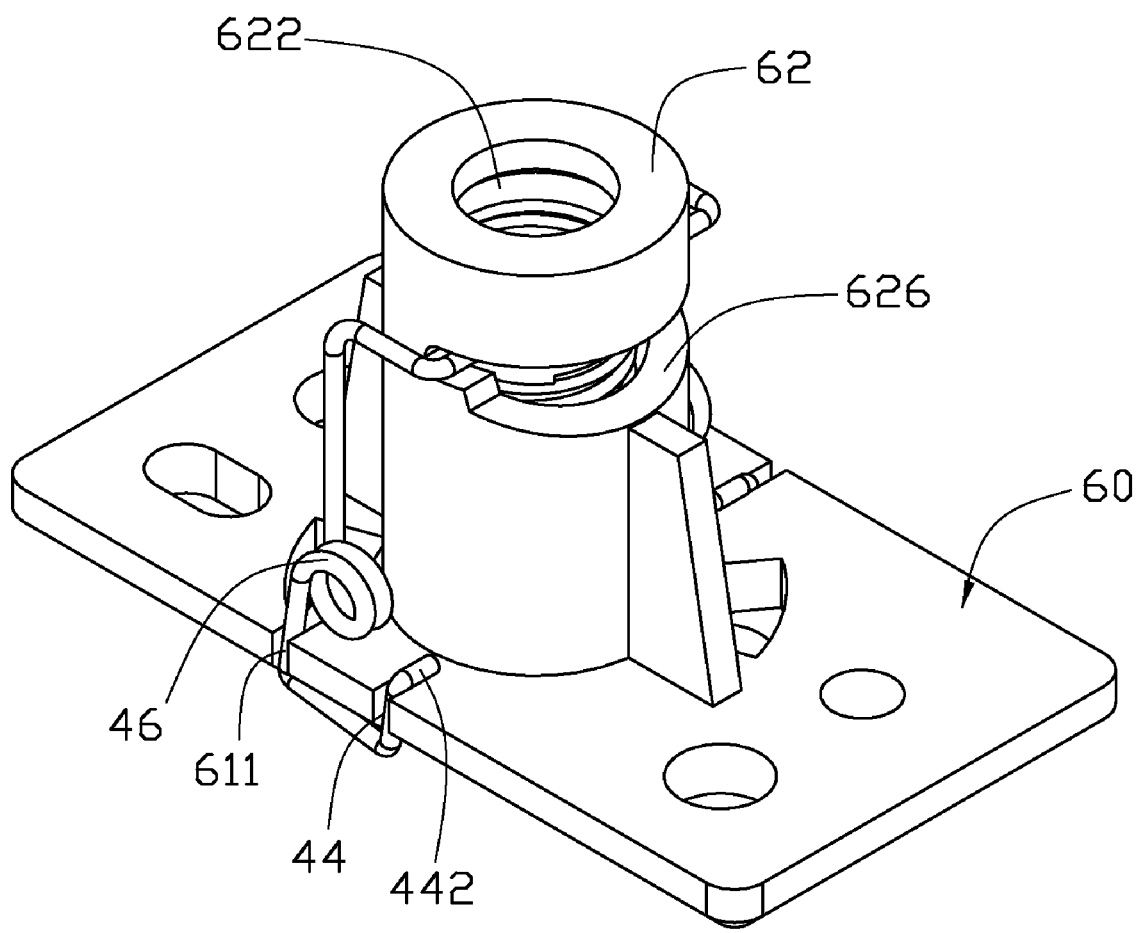
FIG. 7 is an assembled view of one latch member and one mounting member of FIG. 1.

Referring also to FIGS. 3 and 7, each latch member 40 is made by bending a resilient metal wire. The latch member 40 includes a latch portion 42 in a middle thereof, two fixing portions 44 extending down from opposite ends of the latch portion 42, and two resilient portions 46 extending from distal ends of the fixing portions 44 respectively. The latch portion 42 is generally U-shaped. A bending portion 442 extends in from a free end of each latch portion 42. Each resilient portion 46 is helical.

Each connecting pole 50 is made of a metal wire, and includes a first connecting portion 52 and a second connecting portion 54 at opposite ends thereof, respectively.

Each supporting member 60 includes a base plate 61, a columnar supporting portion 62 perpendicularly extending up from the base plate 61. A plurality of ribs is formed between the base plate 61 and a circumference of the supporting portion 62. The supporting portion 62 defines a locking hole 622 therein along its axis. A slot 626 is defined in the circumference of the supporting portion 62 and communicates with the locking hole 622. A mounting hole 68 and a locating hole 69 are defined in the base plate 61 at opposite sides of the supporting portion 62. Two notches 611 are defined in each side of the base plate 61.

Figure 6:
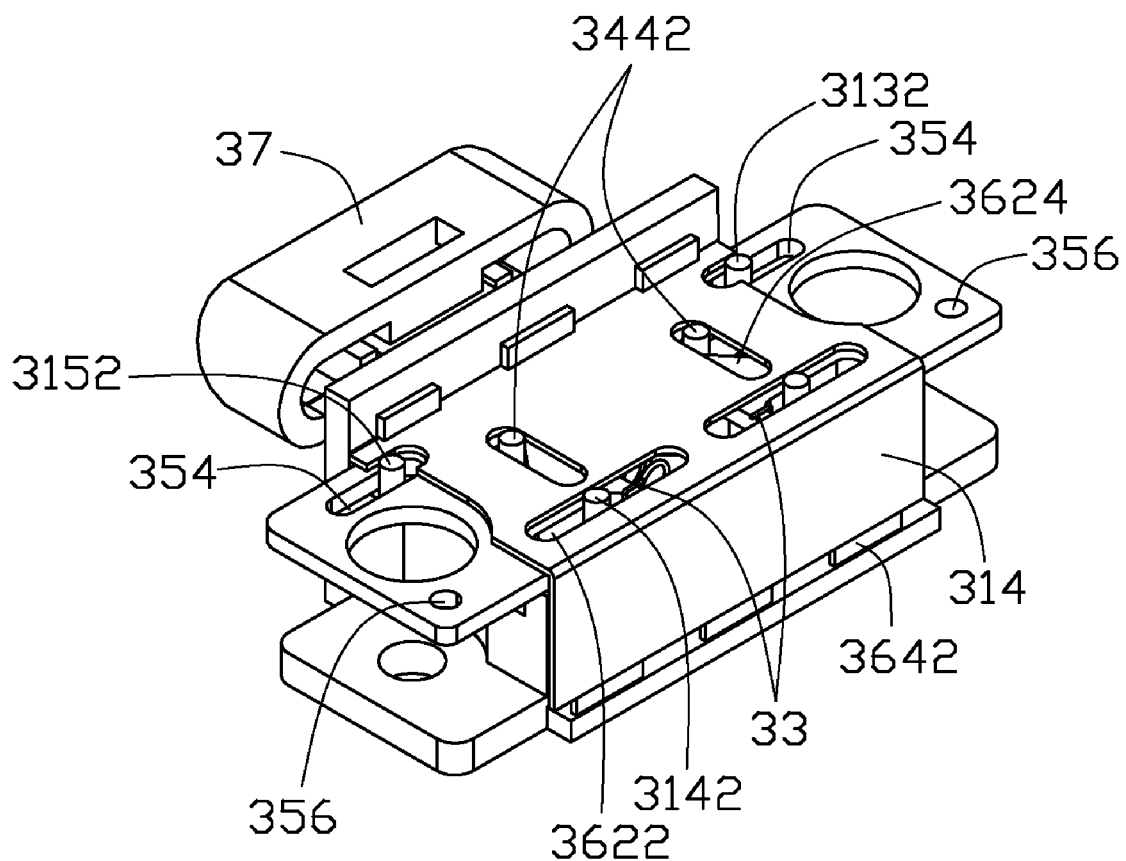
FIG. 6 is an assembled view of FIG. 4.

Referring also to FIG. 6, in assembling the operating apparatus 30, the second resilient member 33 fits the post 3144 of the third sidewall 314 of the receiving member 31. The first resilient member 32 fits the shaft 346 of the driving member 34. The driving member 34 with the first resilient member 32 is received in the receiving member 31 with the first resilient member 32 being compressed. One end of the first resilient member 32 engages with the driving member 34, the other end of the first resilient member 32 engages with an inner surface of the third sidewall 314 of the receiving member 31. The operating portion 342 of the driving member 34 extends through the through slot 3122 of the first sidewall 312 of the receiving member 31. The operating member 37 fits the operating portion 342 via the locking slot 372 thereof. The block 3422 of the operating portion 342 is engaged with the operating member 37 in order to avoid the operating member 37 from being disengaged from the operating portion 342 of the driving member 34.

One of the linking members 35 is supported by the second and third sidewalls 313, 314, and the other linking member 35 is supported by the third and fourth sidewalls 314, 315. The posts 3142 of the third sidewall 314 are inserted through the first sliding slots 352 of the linking members 35, respectively. The post 3132 of the second sidewall 313 and the post 3152 of the fourth sidewall 315 are inserted through the second sliding slots 354 of the linking members 35, respectively. The driving posts 3442 of the driving member 34 are received in the triangular slots of the linking members 35, and engaged with the corresponding slanted surfaces 358, respectively. Two blocking ends of the second resilient member 33 extend through the first sliding slots 352 of the linking members 35 and are engaged with the linking members 35, respectively. The cover 36 covers the linking members 35. The engaging portions 3626 of the horizontal plate 362 are engaged in the locking slots 3124 of the first sidewall 312, respectively. The engaging portions 3642 of the upright plate 364 are engaged in the locking slots 3114 of the bottom wall 311 of the receiving member 31, respectively. The locking slots 3628 of the horizontal plate 362 of the cover 36 are engaged with the post 3132 of the second sidewall 313 and the post 3152 of the fourth sidewall 315 respectively. The driving posts 3442 of the driving member 34 extend through the limiting slots 3624 of the cover 36, respectively. The posts 3142 of the third sidewall 314 of the receiving member 31 extend through the elongated slots 3622 of the cover 36, respectively.

Referring also to FIG. 7, each latch member 40 is mounted to a corresponding supporting member 60. The latch portion 42 of the latch member 40 is engaged in the slot 626 of the supporting member 60. The fixing portions 44 of the latch member 40 are locked in the notches 611 of the base plate 61 respectively to fix the latch member 40 to the supporting member 60.

Figure 8:
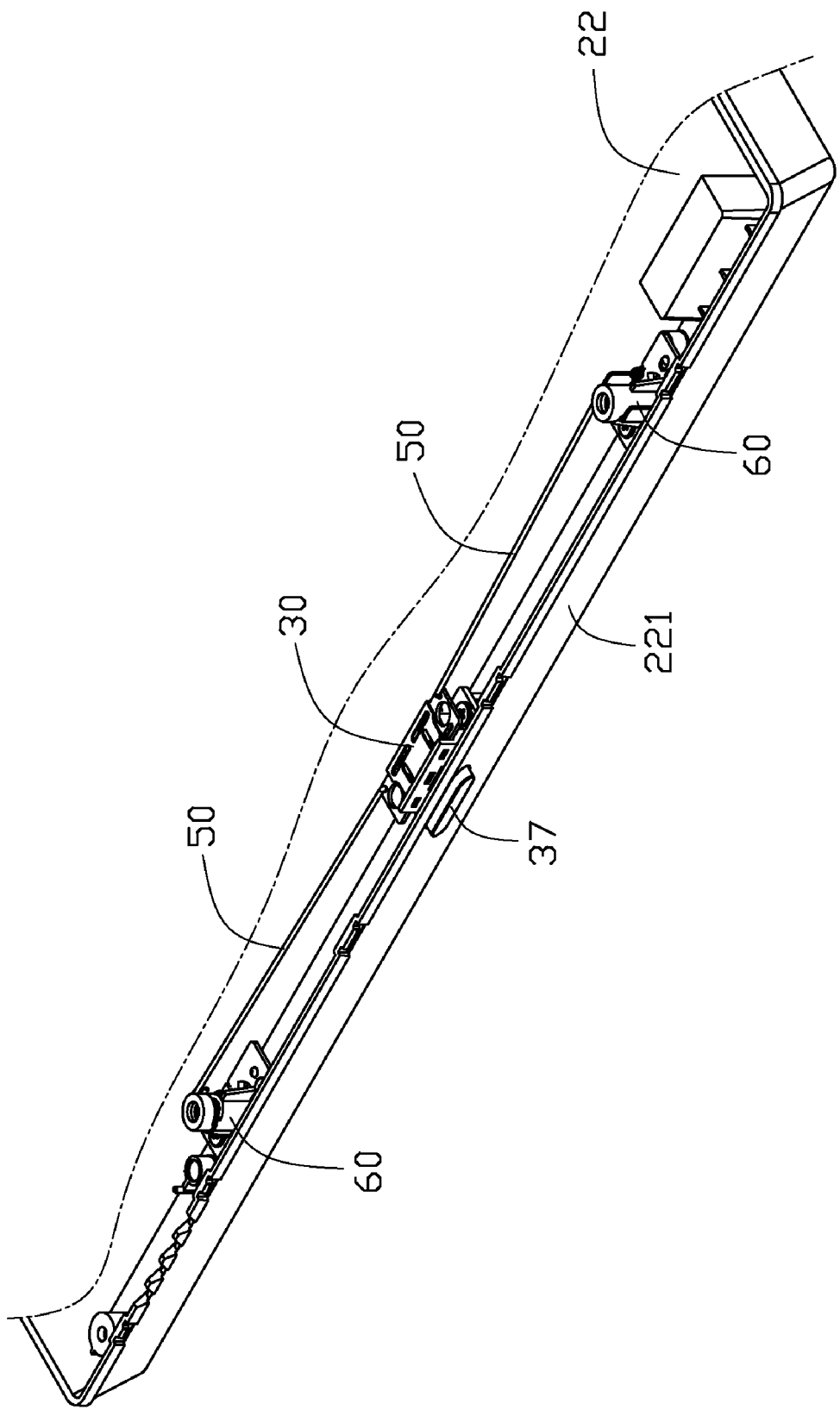
FIG. 8 is an assembled view of FIG. 3.

Referring also to FIG. 8, in assembly, two screws extend through the through holes 3112 of the bottom wall 311 of the receiving member 31 to be engaged in the mounting holes 223 of the columns 222 of the bottom panel 22, for fixing the operating apparatus 30 to the bottom panel 22. The operating member 37 of the operating apparatus 30 is received in the receiving slot 224 of the bottom panel 22.

Each supporting member 60 is fixed to the bottom panel 22 via the corresponding locating rod 225 of the bottom panel 22 being engaged in the locating hole 69 of the supporting member 60 and a screw extending through the mounting hole 68 of the supporting member 60 to be engaged in the mounting hole 227 of the corresponding mounting rod 226 of the bottom panel 22.

Figure 9:
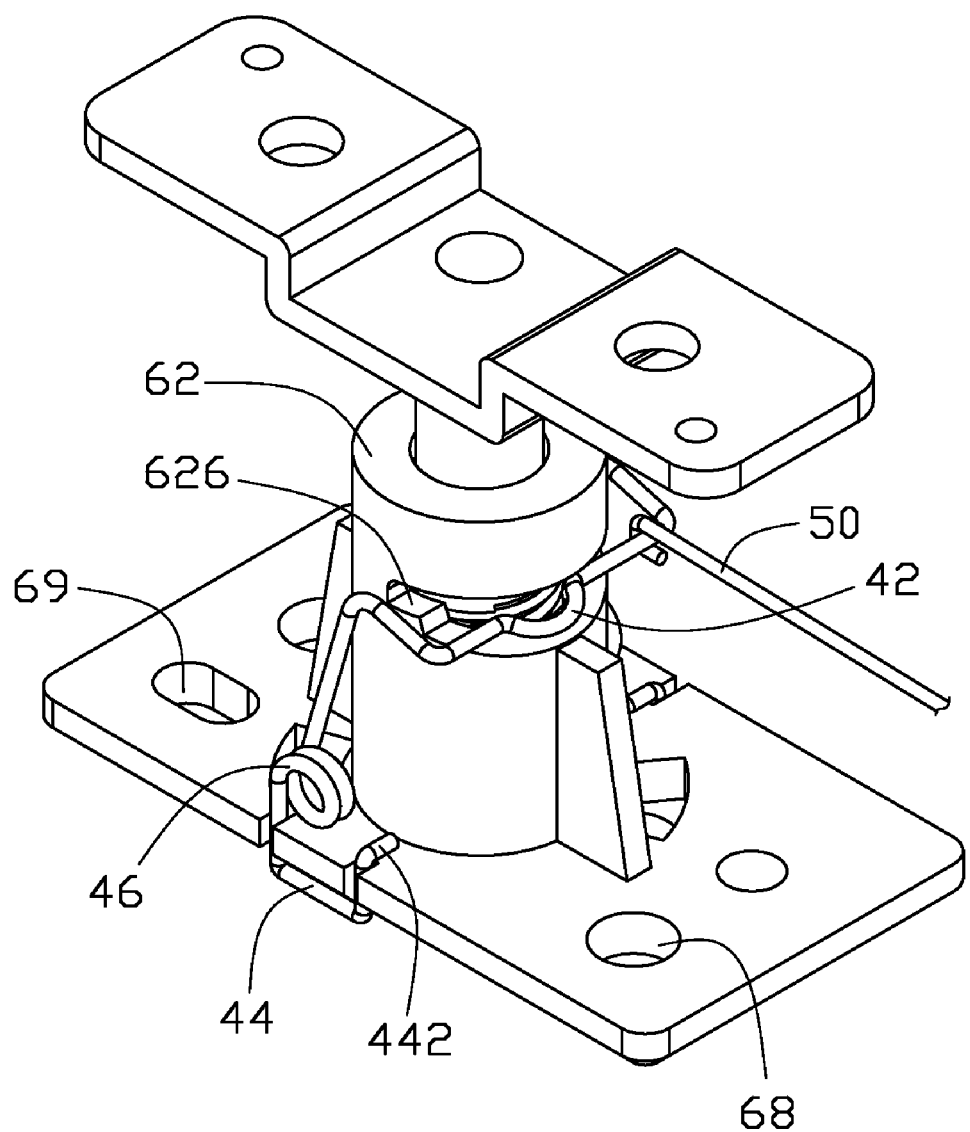
FIG. 9 is a partially assembled view of FIG. 1.

The connecting poles 50 are mounted between the operating apparatus 30 and the latch members 40, respectively. The first connecting portion 52 of each connecting pole 50 is engaged in the locking hole 356 of a corresponding linking member 35. The second connecting portion 54 of each connecting pole 50 is engaged with the corresponding latch member 40, adjacent to the latch portion 42, as shown in FIG. 9. The cutout 3134 of the second sidewall 313 and the cutout 3154 of the fourth sidewall 315 of the receiving member 31 are configured for avoiding interference with the connecting poles 50.

Figure 11:
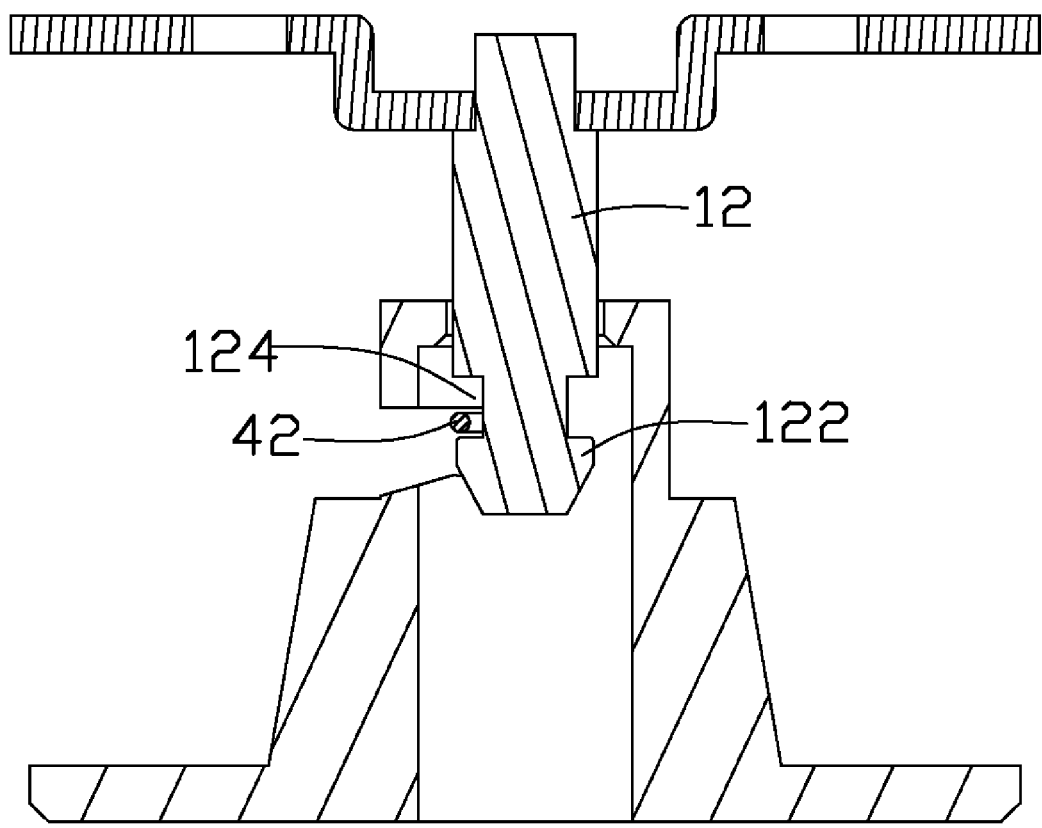

The cover panel 24 is fixed to the bottom panel 22, thereby fully assembling the base unit 20. The cover unit 10 is rotationally attached to the base unit 20. The cover unit 10 is rotated to cover the base unit 20 when the electronic device is not in use. The leading portions 122 of the pins 12 of the cover unit 10 extend through the corresponding through holes 242 of the cover panel 24 of the base unit 20 to abut against the latch portions 42 of the corresponding latch members 40. The cover unit 10 is further rotated, the leading portions 122 of the pins 12 deform the latch members 40 toward the operating apparatus 30 against the resilient portions 46. After the leading portions 122 of the pins 12 entirely extend through the latch members 40 respectively, the latch portions 42 of the latch members 40 rebounds to be engaged in the locking slots 124 of the pins 12 respectively, as shown in FIG. 11. Thus, the cover unit 10 is locked to the base unit 20.

Figure 10:
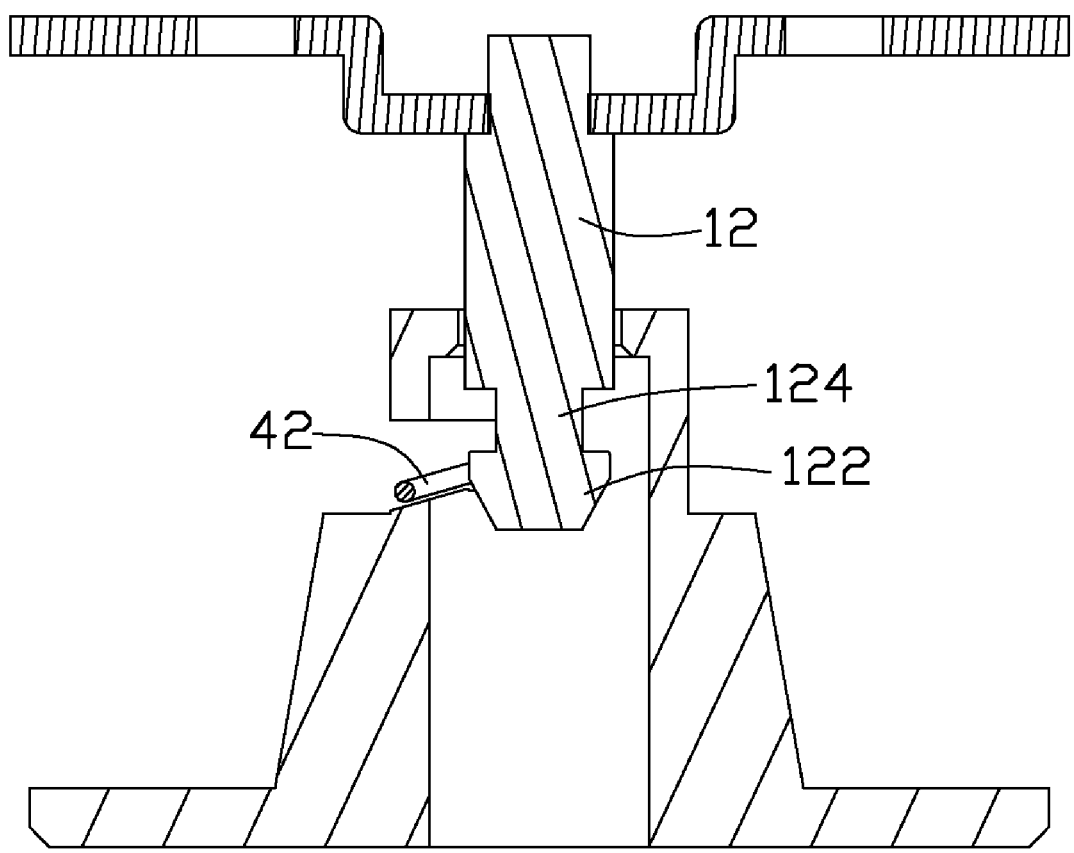
FIGS. 10 and 11 are cross-sectional views of FIG. 9, showing two using states respectively.

To unlock the cover unit 10 from the base unit 20, the operating portion 37 of the operating apparatus 30 is pressed. The driving member 34 slides toward the third sidewall 314 of the receiving member 31 against the first resilient member 32. The driving posts 3442 of the driving member 34 are engaged with the slanted surfaces 358 of the linking members 35 respectively, to move the linking members 35 toward each other. Each linking member 35 drives a corresponding connecting pole 50 to pull the latch portion 42 of the corresponding latch member 40. The latch members 40 are to make the latch portions 42 from the corresponding locking slots 124 of the pins 12, as shown in FIG. 10. Therefore the cover unit 10 is released from the base unit 20.

To unlock the cover unit 10 from the base unit 20, the operating portion 37 of the operating apparatus 30 is pressed. The driving member 34 slides toward the third sidewall 314 of the receiving member 31 against the first resilient member 32. The driving posts 3442 of the driving member 34 are engaged with the slanted surfaces 358 of the linking members 35 respectively, to move the linking members 35 toward each other. Each linking member 35 drives a corresponding connecting pole 50 to pull the latch portion 42 of the corresponding latch member 40. The latch members 40 are to make the latch portions 42 from the corresponding locking slots 124 of the hooks 12, as shown in FIG. 10. Therefore the cover unit 10 is released from the base unit 20.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

For the sake of convenience, the reference numbers and what they represent are shown in the list as follows:

| | |
|---|---|
| 10 | Cover unit |
| 12 | pin |
| 122 | Tapered leading |
| 124 | Locking slot |
| 20 | Base unit |
| 22 | Bottom panel |
| 24 | Cover panel |
| 242 | Through hole |
| 221 | Flange |
| 222 | Column |
| 223 | Mounting hole |
| 224 | Receiving slot |
| 225 | Locating rod |
| 226 | Mounting rod |
| 227 | Mounting hole |
| 30 | Operating apparatus |
| 31 | Receiving member |
| 311 | Bottom wall |
| 3112 | Through hole |
| 3114 | Locking slot |
| 312 | First sidewall |
| 3122 | Through hole |
| 3124 | Locking slot |
| 313 | Second sidewall |
| 3132 | Post |
| 3134 | Cutout |
| 314 | Third sidewall |
| 3142 | Post |
| 3144 | Post |
| 315 | Fourth sidewall |
| 3152 | Post |
| 3154 | Cutout |
| 32 | First resilient member |
| 33 | Second resilient member |
| 34 | Driving member |
| 342 | Operating portion |
| 344 | Driving portion |
| 3422 | Block |
| 3442 | Driving post |
| 346 | Shaft |
| 35 | Linking member |
| 352 | First sliding slot |
| 354 | Second sliding slot |
| 356 | Locking hole |
| 358 | Slanted surface |
| 36 | Cover |
| 362 | Horizontal plate |
| 3622 | Elongated slot |
| 3624 | Limiting slot |
| 3626 | Engaging portion |
| 3628 | Locking slot |
| 364 | Upright plate 364 |
| 3642 | Engaging portion |
| 37 | Operating member |
| 372 | Locking slot |
| 40 | Latch member |
| 42 | Latch portion |
| 44 | Fixing portion |
| 46 | Resilient portion |
| 442 | Bending portion |
| 50 | Connecting pole |
| 52 | First connecting portion |
| 54 | Second connecting portion |
| 61 | Base plate |
| 611 | Notch |
| 62 | Supporting portion |
| 622 | Locking hole |
| 626 | Slot |
| 68 | Mounting hole |
| 69 | Locating hole |

What is claimed is:

1. A chassis, wherein the chassis comprises:
   a cover unit;
   a base unit which comprises a bottom panel and a cover panel fixed to the bottom panel, and a through hole defined in the cover panel;
   a latch mechanism assembly comprising:
   a pin protruding from the cover unit, the pin capable of extending through the through hole of the cover panel;
   an operating apparatus mounted to the bottom panel;
   a supporting member mounted to the bottom panel, wherein the supporting member comprises a base plate, and a supporting portion extending up from the base plate; the supporting portion is a sleeve defining a central locking hole therein to accept the pin to be inserted thereinto, and a slot communicating with the locking hole defined in a periphery of the supporting portion, wherein two notches are defined in the base plate of the supporting member;
   a latch member resiliently mounted to the supporting member, the latch member comprising a latch portion capable of securing the pin, two fixing portions formed from opposite ends of the latch member, and two resilient portions located between the latch portion and each of the fixing portions, wherein the two fixing portions are secured by the notches of the base plate respectively, the latch portion of the latch member is movable within the slot, the two resilient portions are located beside the supporting portion and capable of biasing the latch portion to engage with the pin; and
   a connecting pole connecting the latch member to the operating apparatus;
   wherein the latch member engages the pin when the pin is located within the through hole, and the operating apparatus is capable of retracting the connecting pole and thus causing the latch member to disengage the pin against the resilient portions.

2. The chassis as claimed in claim 1, wherein the operating apparatus comprises a receiving member, a driving member movably mounted to the receiving member, a first resilient member arranged between the receiving member and the driving member, and a linking member connecting to the connecting pole;
   the driving member is adapted to drive the linking member, and the linking member is adapted to operate the connecting pole.

3. The chassis as claimed in claim 2, wherein the driving member comprises a driving portion, and a driving post extends from the driving portion;
   a hole with a slanted surface is defined in the linking member, and the driving post is engaged in the hole to cooperate with the slanted surface;
   the driving post is capable of causing the linking member to move.

4. The chassis as claimed in claim 2, wherein the receiving member comprises a bottom wall, a first sidewall, a second sidewall, a third sidewall, and a fourth sidewall; the first to fourth sidewalls extend from four sides of the bottom wall respectively, the bottom wall and the first to fourth sidewalls form a receiving space that houses the driving member and the first resilient member.

5. The chassis as claimed in claim 4, wherein a through slot is defined in the first sidewall of the receiving member, and the driving member comprises an operating portion extending through the through slot of the first sidewall of the receiving member.

6. The chassis as claimed in claim 5, wherein the operating apparatus further comprises an operating member fitting about the operating portion of the driving member outside the receiving member.

7. The chassis as claimed in claim 4, wherein the driving member comprises an shaft extending away from the operating portion;
   the first resilient member fits over the shaft of the driving member, a first end of the first resilient member is located on the shaft and engaged with the driving member; and a second end of the first resilient member engages the third sidewall of the receiving member.

8. The chassis as claimed in claim 4, wherein the linking member defines a first sliding slot and a second sliding slot parallel to the first sidewall of the receiving member, two posts extend from tops of the third sidewall and the second sidewall and engages the first and second sliding slots respectively to connect the linking member to the receiving member.

9. The chassis as claimed in claim 4, wherein the second sidewall defines a cutout adjacent the third sidewall, and the connecting pole resides within the cutout of the third wall.

10. The chassis as claimed in claim 4, wherein the operating apparatus further comprises a second resilient member;
    a post extends from an inner surface of the third sidewall toward the first sidewall;
    the second resilient member resides about the post of the third sidewall, and the second resilient member is engaged with the linking member.

11. The chassis as claimed in claim 4, wherein the operating apparatus further comprises a cover with a horizontal plate and an upright plate, a plurality of engaging portions extend from distal sides of both the horizontal plate and the upright plate, a plurality of locking slots are defined in an upper portion of the first sidewall of the receiving member for receiving the engaging portions of the horizontal plate, and a plurality of locking slots are defined in the bottom wall outside of the third sidewall of the receiving member for receiving the engaging portions of the upright plate.

12. The chassis as claimed in claim 4, wherein two through holes are defined in opposite sides of the bottom wall of the receiving member, two columns are formed on bottom panel of the base unit, a mounting hole is defined in each column, and two screws extend through the through holes of the bottom wall of the receiving member and engage the mounting holes of the columns of the bottom panel.

13. The chassis as claimed in claim 2, wherein the connecting pole is made of metal, and comprises a first connecting portion and a second connecting portion at opposite ends thereof, the linking member defines a locking hole for engaging the first connecting portion, and the second connecting portion is engaged to the latch portion of the latch member.

14. The chassis as claimed in claim 1, wherein the latch member is made of a resilient metal wire.

15. The chassis as claimed in claim 1, wherein the supporting member further comprises:
    a mounting hole and a locating hole, both defined in the base plate of the supporting member;
    wherein the bottom panel further comprises a locating rod and a mounting rod, and a mounting hole is defined in the mounting rod; and
    the supporting member is fixed to the bottom panel via a screw and the mounting rod.

16. The chassis as claimed in claim 1, wherein the pin comprises a tapered leading portion formed at a distal end thereof, and a locking slot defined in the pin in the vicinity of the leading portion; the latch portion of the latch member is adapted to engage the locking slot.

17. A chassis, wherein the chassis comprises:
a cover unit;
a base unit which comprises a bottom panel and a cover panel fixed to the bottom panel forming a bottom housing, and two through holes defined in the cover panel;
a latch mechanism assembly comprising:
two pins protruding from the cover unit, wherein the pins are capable of extending through the through holes of the cover panel respectively;
a driving member movably mounted within bottom housing;
two linking members movably mounted within the bottom housing;
two supporting members fixed to the bottom panel, wherein each of the supporting members comprises a base plate, and a supporting portion extending up from the base plate; the supporting portion is a sleeve defining a central locking hole therein to accept the pin to be inserted thereinto, and a slot communicating with the locking hole defined in a periphery of the supporting portion, wherein two notches are defined in the base plate of the supporting member;
two latch members resiliently mounted to the supporting members respectively, each of the latch members comprising a latch portion capable of being securing the pin, two fixing portions formed from opposite ends of the latch member, and two resilient portions located between the latch portion and each of the fixing portions, wherein the two fixing portions are secured by the notches of the corresponding base plate respectively, the latch portion of the latch member is movable within the corresponding slot, the two resilient portions are located beside the corresponding supporting portion and capable of biasing the latch portion to engage with the corresponding pin; and
two connecting poles connecting the two latch members to the two linking members respectively;
wherein in a locked position the pins extend through the through holes of the cover panel and are secured by the latch portions of the corresponding latch members, while the driving member is capable of being operated to drive the linking members to pull the corresponding connecting poles for causing the latch members to disengage the pins from the latch members against the resilient portions.

* * * * *